United States Patent [19]

Lee et al.

[11] Patent Number: 4,851,127

[45] Date of Patent: Jul. 25, 1989

[54] NOVEL AMINE-BASED PRESURSOR COMPOUNDS AND COMPOSITE MEMBRANES THEREOF

[75] Inventors: Eric K. L. Lee, Wilmington, Del.; Mark E. Tuttle, Bend, Oreg.

[73] Assignee: Bend Research, Inc., Bend, Oreg.

[21] Appl. No.: 674,541

[22] Filed: Nov. 23, 1984

[51] Int. Cl.$^4$ .............................................. B01D 13/00
[52] U.S. Cl. .................................... 210/654; 210/490; 210/500.37; 564/142
[58] Field of Search ............... 260/404.5 PA, 404.5 R; 564/509, 512; 210/500.2, 500.37, 500.38, 500.39, 490, 654

[56] References Cited

U.S. PATENT DOCUMENTS 4,302,336 11/1981 Kawaguchi et al. ............... 210/654

Primary Examiner—Frank Spear
Attorney, Agent, or Firm—Chernoff, Vilhauer, McClung & Stenzel

[57] ABSTRACT

Novel amine-based precursor compounds comprising the condensation products of dialkylenetriamine and alpha, beta-unsaturated acid halides are disclosed, as well as composite membranes containing such compounds, the membranes being useful in RO-type processes for desalination and the removal of low molecular weight organic compounds such as phenols and carboxylic acids.

29 Claims, No Drawings

NOVEL AMINE-BASED PRESURSOR COMPOUNDS AND COMPOSITE MEMBRANES THEREOF

The government has rights in this invention pursuant to Contract No. 14-34-0001-1449 with the Office of Water Research Technology.

BACKGROUND OF THE INVENTION

A large portion of membranes used today for reverse osmosis (RO) desalination or waste treatment are composite membranes comprising a microporous support supporting a thin water-permeable and solute-rejecting membrane. Typically, the semipermeable membranes are highly crosslinked polyureas and polyamides such as disclosed in Rozell et al., "Non-polysaccharide Membranes for Reverse Osmosis: NS-100 Membranes," in *Reverse Osmosis and Synthetic Membranes*, pp. 249–262 (1977) and Larson et al., "Development of the FT-30 Thin-Film Composite Membrane for Seawater Desalting Applications," *NWSIA Journal* (January 1981).

Such membranes are formed on their supports by the interfacial polymerization of a monomeric, oligomeric or polymeric amine precursor with a suitable crosslinker, the precursor reacting with the crosslinker to form a polymer network which becomes the solute-rejecting layer.

A problem recognized in the art is that of achieving high crosslink density in such interfacial membranes, since high crosslink density improves both selectivity and resistance to chemical attack, such as by chlorine, which is present in the feed waters of most RO applications.

There is therefore a need in the RO composite membrane art for membrane precursor compounds that are capable of forming more highly-crosslinked salt-rejecting membranes.

These needs and others are met by the novel amine-based precursor compounds and composite membranes of the present invention, which are summarized and described in detail below.

SUMMARY OF THE INVENTION

There are novel aspects to the present invention. The most fundamental aspect is the provision of a novel class of chemical compounds comprising the condensation reaction products of dialkylenetriamines and certain alpha, beta-unsaturated acid halides. High crosslink density not previously attainable in interfacial membranes is achievable with such novel compounds. Another aspect comprises oligomers and polymers prepared from such compounds. Still another aspect comprises chlorine-resistant composite membranes made from such compounds. Other aspects include methods of making such compounds and membranes and methods of using such membranes for desalination and other water treatment by reverse osmosis.

DETAILED DESCRIPTION OF THE INVENTION

The novel chemical compounds of the present invention may be designated as amines of the formula

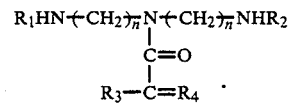

where $R_1$, $R_2$ and $R_3$ are hydrogen or alkyl containing 1 to 20 carbon atoms, preferably 1 to 6, $R_4$ is alkylenyl containing from 1 to 20 carbon atoms, preferably 1 to 6, and n is 1 to 6. An especially preferred amine is 4-N-acryloyl-diethylenetriamine. As explained below, such compounds are made by a condensation reaction between a dialkylenetriamine of the formula

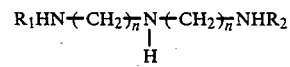

where $R_1$, $R_2$ and n have the same meanings as above, and alpha, beta-unsaturated acid halides of the formula

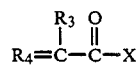

where $R_3$ and $R_4$ have the same meaning as above and X represents a halide group such as F—, Cl—, Br—, and I—.

Membranes of such compounds have dual crosslinking functionality. First, terminal amine groups can be crosslinked in the standard way with, for example, acyl halides to form an interfacial polyamide membrane. Then, the membrane can be further crosslinked through the centers of unsaturation adjacent to the carbonyl functionality, for example, by subjecting it to heat or ultraviolet (uv) radiation.

Interfacial membranes resulting from crosslinking such compounds exhibit excellent RO performance characteristics over extended periods of use with good resistance to chemical attack. In fact, a rather astonishing characteristic of such RO membranes is that their performance has in may cases improved after exposure to feed waters containing free chlorine. Such membranes have further utility in their ability to reject low molecular weight organic compounds such as phenols, carboxylic acids, and ketones.

A suitable form of RO membranes made from the novel compounds of the present invention is a thin film composite membrane comprising a polymeric support and a crosslinked oligomer or polymer of the novel compounds.

Suitable polymeric supports may be generally described as asymmetric, microporous, soluble in solvents such as dimethylformamide and dimethylacetamide, not normally attacked by solutions of chlorine, phenols, carboxylic acids or alkali- or alkali-metal salts, and as having relatively high tensile strengths. Examples include polyamides, polysulfone and derivatives thereof such as those containing ethynyl and phenylethynyl groups along the polysulfone backbone, polyetherimide and derivatives thereof, polyamides and derivatives thereof, and polyvinylidenes fluoride and derivatives thereof. The supports preferably range in thickness between about 1 and 20 mils, and may be made in sheets or hollow fibers by casting techniques known in the art and as exemplified below. Suitable fiber-forming techniques are disclosed in U.S. Pat. Nos. 3,532,527, 3,494,780 and in *J. Appl. Poly. Sci.* 20: 2377 (1976).

The composite membranes of the present invention are generally formed by a four step process comprising (1) formation of the monomeric condensation reaction product of a dialkylenetriamine and an alpha, beta-unsaturated acid halide of the above description, (2) optional formation of a crosslinked oligomer of from about 2 to about 10 repeat units of the condensation reaction product, (3) contacting the polymeric support membrane with the oligomer, and (4) further crosslinking the oligomer on the support.

The monomeric condensation reaction product may be formed by the slow addition of the unsaturated acid halide with high dilution (0.2 to 0.6, preferably 0.4 mEq/ml) to the dialkylenetriamine at ambient temperatures, represented as

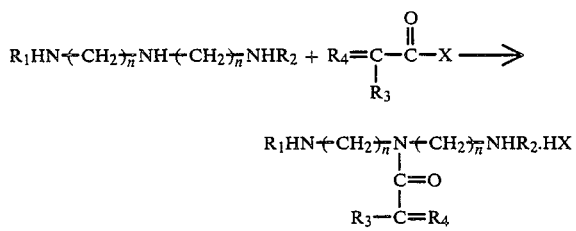

wherein $R_1$, $R_2$, $R_3$, $R_4$, X and n are as defined above.

Oligomers of the above condensation reaction product containing from 2 to 10, most probably from 5 to 8, repeat units and which are water soluble are formed by reacting the monomer form with a 0.1 to 1.0 wt%, preferably 0.5 wt%, solution of a polyfunctional reagent such as tolyene-2,4-diisocyanate (TDI), cyanuric chloride, diphenyl ether disulfonyl chloride, diacyl halides and/or mixtures thereof. Examples of such diacyl halides include aromatic diacyl halides such as ortho-, meta-, or para-phthaloyl chloride, fluoride and iodide, aromatic diacyl halides such as isophthaloyl-chloride, aliphatic diacyl halides such as adipoyl chloride and sebacoyl chloride and alicyclic diacyl halides such as cyclobutanedicarboxylic acid chloride. Suitable solvents for such polyfunctional reagents include mixtures of chloroform, dichloromethane, hexane and pentane in the volume ratio 3:1 aliphatic hydrocarbon to halogenated hydrocarbon.

The oligomer-forming reaction when the polyfunctional reagent is a diacyl halide such as $R_5(COCl)_2$ where $R_5$ is aromatic, aliphatic or alicyclic as described above may be represented as

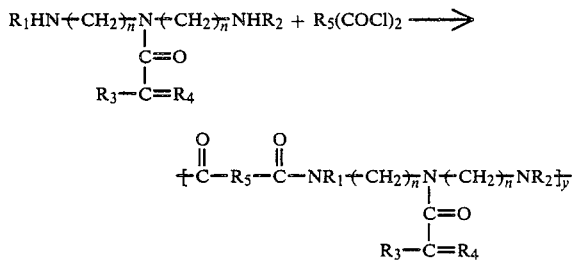

where $R_1$, $R_2$, $R_3$, $R_4$, $R_5$ and n are as defined above and y is 2 to 10.

The asymmetric microporous polymeric support membrane is contacted with a dilute (1 to 5 wt%) aqueous solution of the oligomer by any suitable method such as immersion in the case of a flat sheet support or pumping into the lumens in the case of a hollow fiber support. Excess oligomeric solution is then drained from the support membrane, whereupon the oligomer is crosslinked by methods known in the art such as treatment with a crosslinking agent, photochemical irradiation and/or heat treatment. Suitable crosslinking agents include trifunctional acid chlorides or isocyanates such as trimesoychloride. The crosslinking agent treatment is best accomplished in a highly dilute (0.25 to 1.0 wt%) solution thereof at ambient temperatures for less than 2 minutes. Suitable solvents for the crosslinking agents include hexanes and other aliphatic hydrocarbons inert to the support. Photochemical irradiation may be effected by subjecting the oligomer-drenched support to uv radiation for periods of 1 to 15 minutes. Heat curing is best accomplished after air drying and at temperatures between 90° and 120° C. for 5 to 15 minutes.

When the crosslinker is trimesoyl chloride and the monomeric form of the precursor is 4-N-acryloyldiethylenetriamine, the polymerized form of the membrane is believed to be

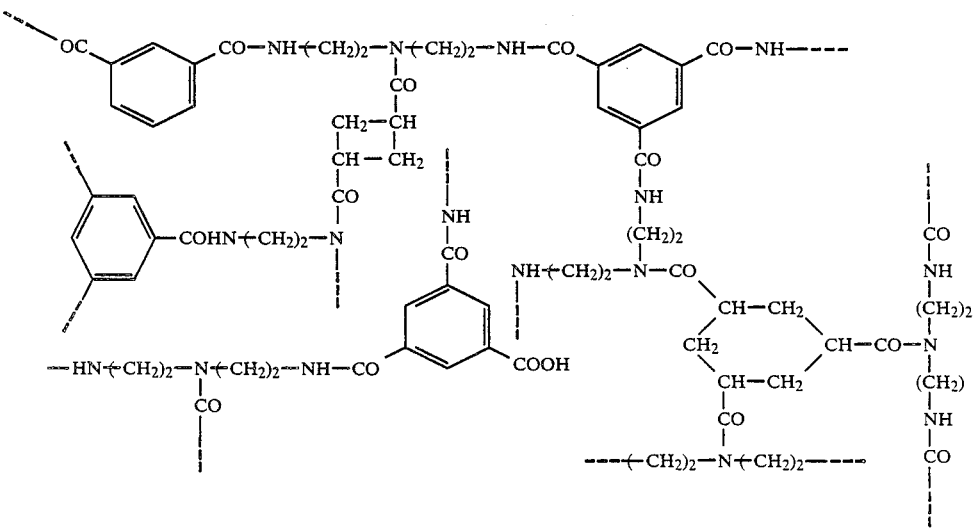

EXAMPLES

Example 1

4-N-acryloyl-diethylenetriamine was prepared by slowly adding, at 23° C., 200 ml of a solution of acryloyl chloride in a mixture of hexane and dichloromethane ($C_6H_{14}:C_2Cl_2=3:1$) at a concentration of 3.6 wt% (0.4 mEq/ml) to 600 ml of 1.4 wt% (0.4 mEq/ml) diethylenetriamine which had been purified by vacuum distillation. The reaction product was oligomerized by the addition of 200 ml of a 4.1 wt% solution of isophthaloyl chloride in dichloromethane at 20° C. with mechanical stirring. An asymmetric microporous polysulfone support flat sheet membrane 4 mils thick was immersed in a 2 wt% aqueous solution of 4-N-acryloyl-diethylenetriamine oligomer, drained of excess solution, then immersed in a 0.5 wt% solution of trimesoyl chloride at 20° C. for 30 seconds. The composite membrane was then air-dried at room temperature for 30 minutes and subjected to heat treatment at 105° C. for 10 minutes.

Example 2

An RO comparative performance test, with the feed water containing 10 ppm free chlorine in the form of NaOCl and 5000 ppm NaCl at pH 4.5 at 400 psi and 25° C. was conducted with the composite membrane prepared in Example 1 (designated "3N8AC") and compared with FT-30 RO membrane made by FilmTec Corporation of Minneapolis, Minn., the latter generally being regarded as the best available composite RO membrane from the standpoint of resistance to chlorine attack. The results, with flux being expressed in gallons per square foot of membrane surface area per day (gfd), are shown in Table I.

TABLE I

| Type of Membrane | Day 1 (after exposure to chlorine) | | | Day 55 | | |
| --- | --- | --- | --- | --- | --- | --- |
| | Flux (gfd) | Rejection (%) | Concentration of NaCl in Permeate (ppm) | Flux (gfd) | Rejection (%) | Concentration of NaCl in Permeate (ppm) |
| 3N8AC | 8.0 | 97.0 | 150 | 11.7 | 96.0 | 200 |
| FT-30 | 1.9 | 99.6 | 20 | 1.0 | 98.7 | 65 |

As is apparent from the data in Table I, flux for the prior art FT-30 membrane decreased by about half in the 55 day test period, while flux for the 3N8AC composite membrane prepared according to the present invention actually increased by nearly half in the same period. The salt rejections of both membranes decreased by about 1%.

Examples 3-4

Other comparative RO tests for removal of NaCl, MgSO$_4$, phenol and acetic acid from water for FT-30 membranes and two membranes prepared in substantially the same manner described in Example 1 (also designated "3N8AC") were made under the conditions and with the results recited in Table II.

TABLE II

| Comp. Membrane Designation | MgSO₄ 5,000 ppm 800 psi | | NaCl 5,000 ppm 400 psi | | NaCl 5,000 ppm 800 psi | | Phenol pH 8.5 2,000 ppm 400 psi | | Phenol pH 8.5 2,000 ppm 800 psi | | Phenol pH 8.5 20,000 ppm 400 psi | | Phenol pH 8.5 20,000 ppm 800 psi | | Acetic Acid pH 8.5 400 ppm 400 psi | | Acetic Acid pH 8.5 400 ppm 800 psi | | Acetic Acid pH 8.5 4,000 ppm 400 psi | | Acetic Acid pH 8.5 4,000 ppm 800 psi | |
|---|---|---|---|---|---|---|---|---|---|---|---|---|---|---|---|---|---|---|---|---|---|---|
| | Flux (gfd)* | Rej (%) | Flux (gfd) | Rej (%) | Flux (gfd) | Rej (%) | Flux (gfd) | Rej (%) | Flux (gfd) | Rej (%) | Flux (gfd) | Rej (%) | Flux (gfd) | Rej (%) | Flux (gfd) | Rej (%) | Flux (gfd) | Rej (%) | Flux (gfd) | Rej (%) | Flux (gfd) | Rej (%) |
| FT-30 | 18.4 ± 2.2 | 99.91 ± 0.02 | 9.4 ± 0.8 | 99.37 ± 0.08 | 15.9 ± 0.79 | 99.61 ± 0.1 | 9.4 ± 1.4 | 90.9 ± 0.5 | 9.4 ± 1.91 | 87.4 ± 2.72 | 1.7 ± 0.7 | 83.3 ± 3.27 | 3.9 ± 1.02 | 82.1 ± 5.7 | 7.0 ± 1.1 | >99.75 | 12.0 ± 1.8 | >99.75 | 6.2 ± 0.95 | 99.6 ± 0.32 | 11.2 ± 1.85 | 99.92 ± 0.14 |
| FT-30 | 18.9 ± 1.72 | 99.94 ± 0.02 | 8.0 ± 0.43 | 99.36 ± 0.13 | 16.3 ± 0.86 | 99.62 ± 0.09 | 5.2 ± 0.1 | 87.0 ± 0.6 | 9.6 ± 0.2 | 90.2 ± 0.5 | 2.0 ± 0.1 | 80.3 ± 1.9 | 3.6 ± 0.2 | 84.4 ± 1.9 | 10.2 ± 0.72 | 94.1 ± 1.81 | 16.9 ± 0.38 | 97.9 ± 0.37 | 8.8 ± 0.25 | 99.36 ± 0.31 | 16.1 ± 0.32 | 99.59 ± 0.07 |
| 3N8AL | 23.2 ± 1.1 | 99.81 ± .14 | 13.4 ± 0.5 | 90.4 ± 5.9 | 29.3 ± 0.7 | 94.2 ± 2.8 | 13.5 ± 0.5 | 89.5 ± 3.9 | 23.7 ± 0.9 | 91.4 ± 2.2 | 6.8 ± 0.3 | 89.0 ± 4.2 | 10.05 ± 0.3 | 91.4 ± 3.5 | 16.9 ± 0.5 | 99.3 ± 1.15 | 24.4 ± 0.9 | >99.75 | 5.2 ± 0.3 | 98.7 ± 1.8 | 27.0 ± 0.3 | 98.2 ± 2.5 |
| 3N8AC | 41.6 ± 9.2 | 99.31 ± 1.8 | 19.0 ± 0.91 | 89.3 ± 1.95 | | | 20.8 ± 0.62 | 83.8 ± 1.2 | 27.2 ± 0.67 | 83.4 ± 2.05 | 10.0 ± 0.78 | 78.4 ± 2.28 | 19.7 ± 1.01 | 83.1 ± 1.61 | 15.6 ± 0.15 | >99.75 | 24.5 ± 0.15 | >99.75 | 14.0 ± 0.52 | 99.0 ± 0.26 | 23.8 ± 0.20 | 99.16 ± 0.25 |

The results shown in Table II demonstrate that RO membranes prepared in accordance with the present invention reject low molecular weight organic compounds such as phenols and carboxylic acids as well as FT-30 membranes, but with fluxes that are about 1.5 to 3 times greater than those of FT-30. Such performance is highly desireable in the treatment of certain oil refining and synthetic fuel production waste streams.

Examples 5–10

Six additional membranes prepared in substantially the same manner described in Example 1 were tested for rejection of various NaCl and MgSO₄ feed solutions at 800 psi and 25° C. with the results shown in Table III, with rejection being expressed as R(%) and flux as J(gfd).

TABLE III

| Example Number | 1 wt % NaCl | | 3.5 wt % NaCl | | 1 wt % MgSO₄ | |
|---|---|---|---|---|---|---|
| | R(%) | J(gfd) | R(%) | J(gfd) | R(%) | J(gfd) |
| 5 | 95.3 | 31 | 78 | 19 | 97.4 | 33 |
| 6 | 95.3 | 34 | 79 | 20 | 98.6 | 34 |
| 7 | 95.6 | 36 | 77 | 20 | 98.6 | 34 |
| 8 | 96.5 | 33 | 82 | 19 | 98.8 | 32 |
| 9 | 96.3 | 27 | 80 | 15 | 99.43 | 26 |
| 10 | 96.6 | 23 | 83 | 14 | 99.62 | 22 |

The very high fluxes and moderate NaCl rejections exhibited by the membranes of the present invention indicate excellent suitability for desalting brackish waters.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An amine of the formula:

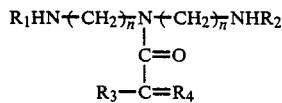

where $R_1$, $R_2$ and $R_3$ are hydrogen or alkyl containing from 1 to 20 carbon atoms, $R_4$ is alkylenyl containing from 1 to 20 carbon atoms and n is an integer from 1 to 6.

2. The amine of claim 1 wherein $R_1$, $R_2$ and $R_3$ are hydrogen, $R_4$ is $CH_2$ and n is 2.

3. Oligomers of claim 1 resulting from polymerizing the amine of claim 1 wherein the polymerization is by means of reaction with a difunctional reagent.

4. Oligomers of claim 3 wherein the difunctional reagent is a diacyl halide.

5. Polymers resulting from crosslinking the amine of claim 1.

6. Polymers of claim 5 wherein additional crosslinking is by means of heating.

7. Polymers of claim 5 wherein additional crosslinking is by means of ultraviolet radiation.

8. Polymers of claim 5 wherein the crosslinking is by means of reaction with a trifunctional crosslinking reagent.

9. Polymers of claim 8 wherein the trifunctional crosslinking reagent is selected from acyl halides and isocyanates.

10. An oligomeric amine of the formula

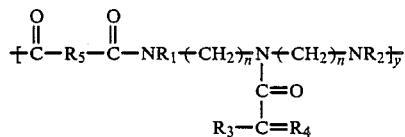

where $R_1$, $R_2$ and $R_3$ are hydrogen or alkyl containing from 1 to 20 carbon atoms, $R_4$ is alkylenyl containing from 1 to 20 carbon atoms, $R_5$ is aromatic, aliphatic or alicyclic, n is an integer from 1 to 6 and y is an integer from 2 to 10.

11. Polymers resulting from crosslinking the oligomeric amine of claim 10.

12. Polymers of claim 11 wherein the crosslinking is by means of heating.

13. Polymers of claim 11 wherein the crosslinking is by means of ultraviolet radiation.

14. Polymers of claim 11 wherein the crosslinking is by means of reaction with a trifunctional crosslinking reagent.

15. Polymers of claim 14 wherein the trifunctional crosslinking reagent is selected from acyl halides and isocyanates.

16. The condensation reaction product of a dialkylenetriamine of the formula

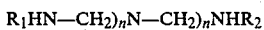

with an alpha, beta-unsaturated acid halide of the formula

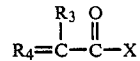

where $R_1$, $R_2$ and $R_3$ are hydrogen or alkyl containing from 1 to 20 carbon atoms, $R_4$ is alkyenyl containing from 1 to 20 carbon atoms, X is halide and n is an integer from 1 to 6.

17. The product of claim 16 wherein the dialkylenetriamine is diethylenetriamine and the acid halide is acryloyl chloride.

18. A composite membrane comprising a polymeric support and a polymerized amine of the formula

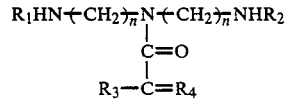

where $R_1$, $R_2$ and $R_3$ are hydrogen or alkyl containing from 1 to 20 carbon atoms, $R_4$ is alkylenyl containing from 1 to 20 carbon atoms, and n is an integer from 1 to 6, and where polymerization of said amine is by crosslinking or by reaction with a difunctional reagent.

19. The composite membrane of claim 18 wherein the crosslinking is by means selected from reaction with a polyfunctional crosslinking reagent, heating and ultraviolet radiation.

20. The composite membrane of claim 18 wherein said polymeric support is selected from the group consisting of polyamides, polysulfone and derivatives thereof, polyetherimide and derivatives thereof, and polyvinylidene fluoride and derivatives thereof.

21. The composite membrane of claim 18 wherein said amine is 4-N-acryloyl-diethylenetriamine.

22. A composite membrane comprising a polymeric support and a polymerized oligomeric amine of the formula

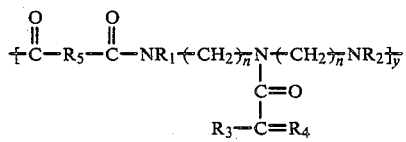

where $R_1$, $R_2$ and $R_3$ are hydrogen or alkyl containing from 1 to 20 carbon atoms, $R_4$ is alkylenyl containing from 1 to 20 carbon atoms, $R_5$ is aromatic, aliphatic or alicyclic, n is an integer from 1 to 6 and y is an integer from 2 to 10.

23. The composite membrane of claim 22 wherein the polymerization comprises crosslinking by means selected from reaction with a trifunctional crosslinking reagents, heating and ultraviolet radiation.

24. The composite membrane of claim 23 wherein the trifunctional crosslinking reagent is selected from triacyl halides and isocyanates.

25. A method of treating water for the removal of salts and lower molecular weight organic compounds comprising subjecting said water to reverse osmosis by the composite membrane of claim 22.

26. The method of claim 25 wherein said water is chlorinated water.

27. The method of claim 25 wherein said water is seawater.

28. The method of claim 25 wherein said low molecular weight organic compounds are selected from the group consisting of phenols and carboxylic acids.

29. The method of claim 25 wherein said polymeric support of said composite membrane is selected from the group consisting of polyamides, polysulfone and derivatives thereof, polyetherimide and derivatives thereof, polyethersulfone and derivatives thereof and polyvinylidene fluoride and derivatives thereof, $R_1$, $R_2$ and $R_3$ are hydrogen, $R_4$ is $CH_2$, $R_5$ is aromatic, n is 2 and y is 2 to 10.

* * * * *

UNITED STATES PATENT AND TRADEMARK OFFICE
CERTIFICATE OF CORRECTION

PATENT NO. : 4,851,127

DATED : July 25, 1989

INVENTOR(S) : Eric K. L. Lee, Mark E. Tuttle

Page 1 of 2

It is certified that error appears in the above-identified patent and that said Letters Patent is hereby corrected as shown below:

Title:  Change "PRESURSOR" to --PRECURSOR--.

Col. 1, Line 2:   Change "PRESUROR" to --PRECURSOR--;
Col. 1, Line 49:  Change "novel" to --several--.
Col. 3, Line 33:  Change "monomer" to --monomeric--;
Col. 3, Line 35:  Change "tolyene-2" to --tolylene-2--;
Col. 3, Lines 38-39: Italicize --ortho--, --meta--, and --para--.
Col. 5, Line 7:   Change "$(C_6H_{14}:C_2Cl_2=3:1)$" to --$(C_6H_{14}:CH_2Cl_2=3:1)$--

UNITED STATES PATENT AND TRADEMARK OFFICE
CERTIFICATE OF CORRECTION

PATENT NO. : 4,851,127
DATED : July 25, 1989
INVENTOR(S) : Eric K. L. Lee, Mark E. Tuttle It is certified that error appears in the above-identified patent and that said Letters Patent is hereby corrected as shown below:

Col. 7, Table II: Change "3N8AL" to --3N8AC--.

Col. 10, Line 33: Change "$R_1HN--CH_2)_nN--CH_2)_nNHR_2$" to --$R_1HN(CH_2)_nN(CH_2)_nNHR_2$--;

Col. 10, Line 43: Change "alkyenyl" to --alkylenyl--.

Col. 12, Line 7: Change "lower" to --low--.

Signed and Sealed this

Sixth Day of August, 1991

Attest:

HARRY F. MANBECK, JR.

*Attesting Officer*  *Commissioner of Patents and Trademarks*